E. BAKER.
HAND TOOL FOR DETACHING AND REMOVING PISTON RINGS AND THE LIKE.
APPLICATION FILED JUNE 11, 1918.
1,283,620.
Patented Nov. 5, 1918.
2 SHEETS—SHEET 2.
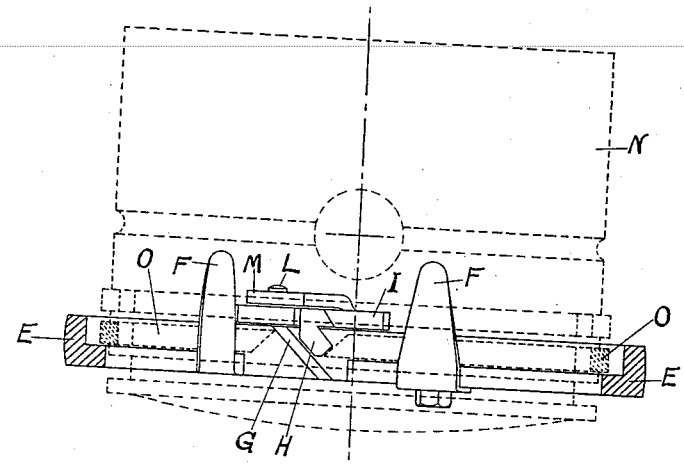
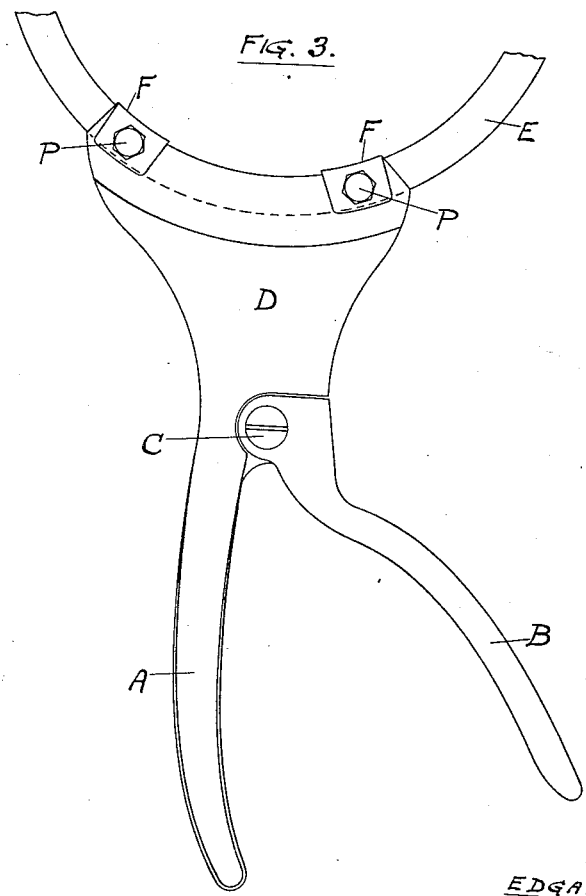
INVENTOR:
EDGAR BAKER.
Per John E. Walsh
ATTORNEY.

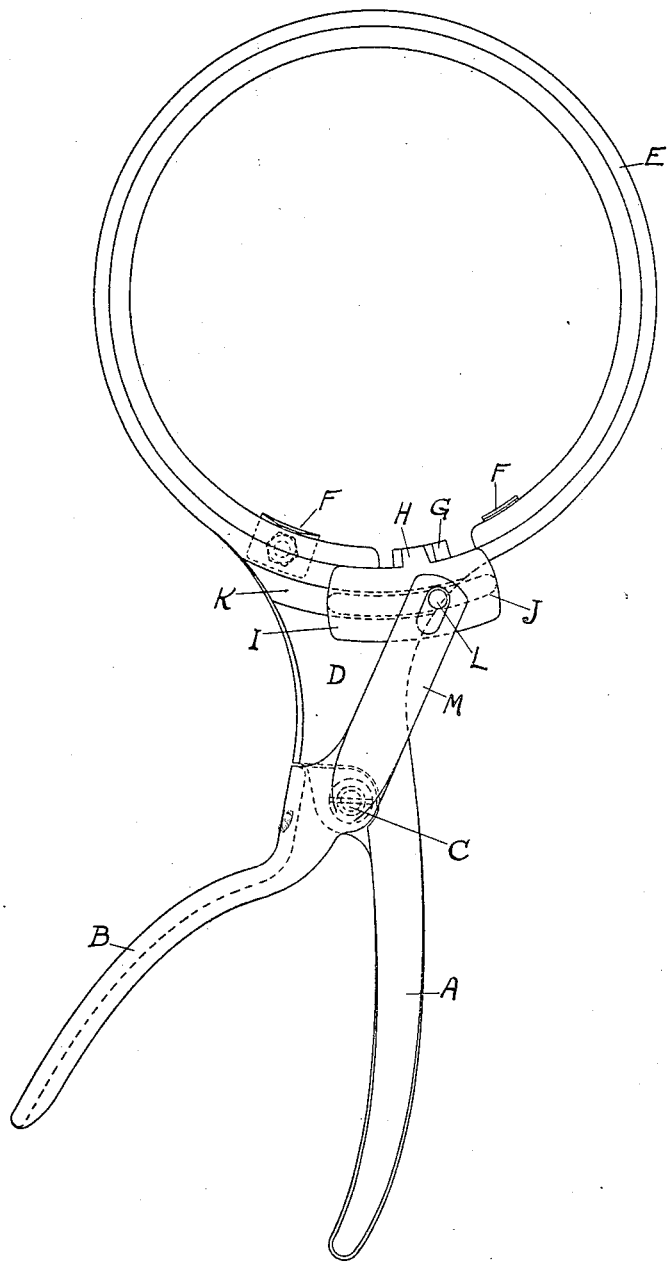

UNITED STATES PATENT OFFICE.

EDGAR BAKER, OF DONCASTER, ENGLAND.

HAND-TOOL FOR DETACHING AND REMOVING PISTON-RINGS AND THE LIKE.

1,283,620.

Specification of Letters Patent. Patented Nov. 5, 1918.

Application filed June 11, 1918. Serial No. 239,438.

*To all whom it may concern:*

Be it known that I, EDGAR BAKER, a subject of the King of Great Britain and Ireland, residing ordinarily at Doncaster, in the county of York, England, but now a 1st air mechanic in the Royal Air Force, and at present serving with His Majesty's Expeditionary Forces in France, have invented a new and useful Improvement in Hand-Tools for Detaching and Removing Piston-Rings and the like, of which the following is a specification.

This invention relates to an improved hand tool or appliance for detaching and removing rings from pistons and the like.

My invention is illustrated in the accompanying drawings, in which:—

Figure 1 is a plan of the tool or appliance complete;

Fig. 2 is a sectional elevation of same, illustrating also the operative position of the tool relative to the piston;

Fig. 3 is a partial plan of the reverse side of the tool as constructed in a slightly modified form.

According to my said invention (Figs. 1 and 2) the body of the tool comprises fixed and movable handles A, B, suitably curved or shaped, and pivoted together in an approximately central position at C. The fixed handle A terminates at its outer end in a curved flat segment D, and integral with this segment D is formed an internally-flanged annular member E adapted to slide longitudinally over the piston and its ring or rings and to loosely embrace the same. This annular part E of the tool has a pair of spaced-apart pointed spring fingers F (either integral or detachable) projecting within its flanged inner periphery, parallel to the axis of the piston rod, and it is provided with a small fixed tooth or stop G also within its inner periphery. A movable tooth H, slidable circumferentially to a limited extent with the annular part E of the tool, works in conjunction with this fixed tooth G, said sliding movement being controlled by means of a guide plate I having a rib J working within a curved groove K in the segmental part D of the fixed handle, and said guide plate I having a pin-and-slot connection L to the outer end M of the movable handle B.

The annular part E of the tool having been slid into position over the piston N, the pair of spring fingers F are inserted between the piston N and the piston ring O which is to be removed, the fixed and movable teeth G H falling within the gap of the piston ring O as shown in Fig. 2. Upon the handles A B being then compressed, the piston ring O is expanded within the flanged annular part E of the tool by the action of the fixed and movable teeth G, H, the spring fingers F maintaining the ends of the piston ring in engagement with the teeth, and the teeth having inclined faces which tend to hold the piston ring down against the flange. The expanded piston ring is then contained within the flanged annular part E of the tool, which can then be lifted off the piston N, after which the piston ring can be readily removed from the tool.

If desired the flanged annular part E, instead of being integral with the body of the tool as hereinbefore described, may be detachably connected by studs P (Fig. 3) to the body of the tool, and be interchangeable thereon in various sizes.

My improved ring extractor has the following particular advantages:—It is impossible to break a ring, as the annular part of the tool prevents the ring from being expanded too much, and the expansion stress is equalized all around. The operation is much quicker than any other method, and can be performed by any novice without the necessity for skilled labor.

I claim:

1. For detaching and removing rings from pistons and the like, a hand tool or appliance comprising, in combination, fixed and movable handles pivoted together, an annular member carried by the fixed handle and adapted to slide longitudinally over the piston and piston ring and to loosely embrace the same, a pair of spaced-apart pointed spring fingers carried by said annular member and adapted to be inserted between piston and piston ring, a fixed tooth or stop projecting from the inner periphery of said annular member and adapted to engage within the gap of the piston ring, and a movable tooth also adapted to engage within the gap of the piston ring and slidable circumferentially within said annular member under control of the movable handle, the coaction of said fixed and movable teeth (within the gap of the piston ring) being such that on the handles being compressed the piston ring is expanded and contained within said annular member, substantially as herein set forth.

2. A tool or appliance as claimed in claim 1, said fixed handle being provided with a curved groove, a ribbed guide plate working within said curved groove and carrying said movable tooth and also having a pin-and-slot connection to said movable handle.

3. A tool or appliance as claimed in claims 1 and 2, and in which said annular member is detachably connected to the body of the tool and is interchangeable thereon in various sizes, substantially as herein described.

EDGAR BAKER.

Witnesses:
  F. WINOW,
  ALFRED HOLDEN.